United States Patent [19]

Worbois

[11] 4,367,903

[45] Jan. 11, 1983

[54] SYSTEM FOR AUTOMATICALLY DELAYING APPLICATION OF A SNOW BRAKE FOR A RAILWAY VEHICLE

[75] Inventor: Robert J. Worbois, North Huntingdon, Pa.

[73] Assignee: American Standard Inc., Wilmerding, Pa.

[21] Appl. No.: 200,744

[22] Filed: Oct. 27, 1980

[51] Int. Cl.³ .............................................. B60T 15/46
[52] U.S. Cl. ...................................... 303/13; 188/198; 303/72; 303/81; 303/86
[58] Field of Search .................................. 303/68–83, 303/84 R, 84 A, 86, 66, 28, 33, 36, 42, 13, 1, 3, 15, 14; 188/33, 34, 83, 196, 198–203, 153

[56] References Cited

U.S. PATENT DOCUMENTS

| | | | |
|---|---|---|---|
| 2,877,870 | 3/1959 | Tack et al. | 188/83 X |
| 3,180,695 | 4/1965 | McClure | 303/86 |
| 3,707,208 | 12/1972 | Kyllonen | 188/202 |

*Primary Examiner*—Douglas C. Butler

*Attorney, Agent, or Firm*—G. J. Falce

[57] ABSTRACT

A snow brake control system in which application of the snow brake pressure during release of a normal brake application is withheld for a duration sufficient to assure movement of the vehicle brake apparatus from a brake application position to a release position, to thereby cause automatic slack adjuster action to take place. In one embodiment, operation of a piloted pneumatic valve is delayed by restricting the exhaust of pressure from a volume reservoir via a choke to thereby momentarily withhold the connection of snow brake control pressure to one inlet of a double check valve that is subject at its opposite inlet to normal brake control pressure. The double check valve is effective to connect the predominant one of the pressures at its opposite inlets to a relay valve to produce brake pressure. In a second embodiment, the double check valve is eliminated and the pilot pneumatic valve controls the connection of either snow brake or normal brake control pressure to the relay valve.

7 Claims, 2 Drawing Figures

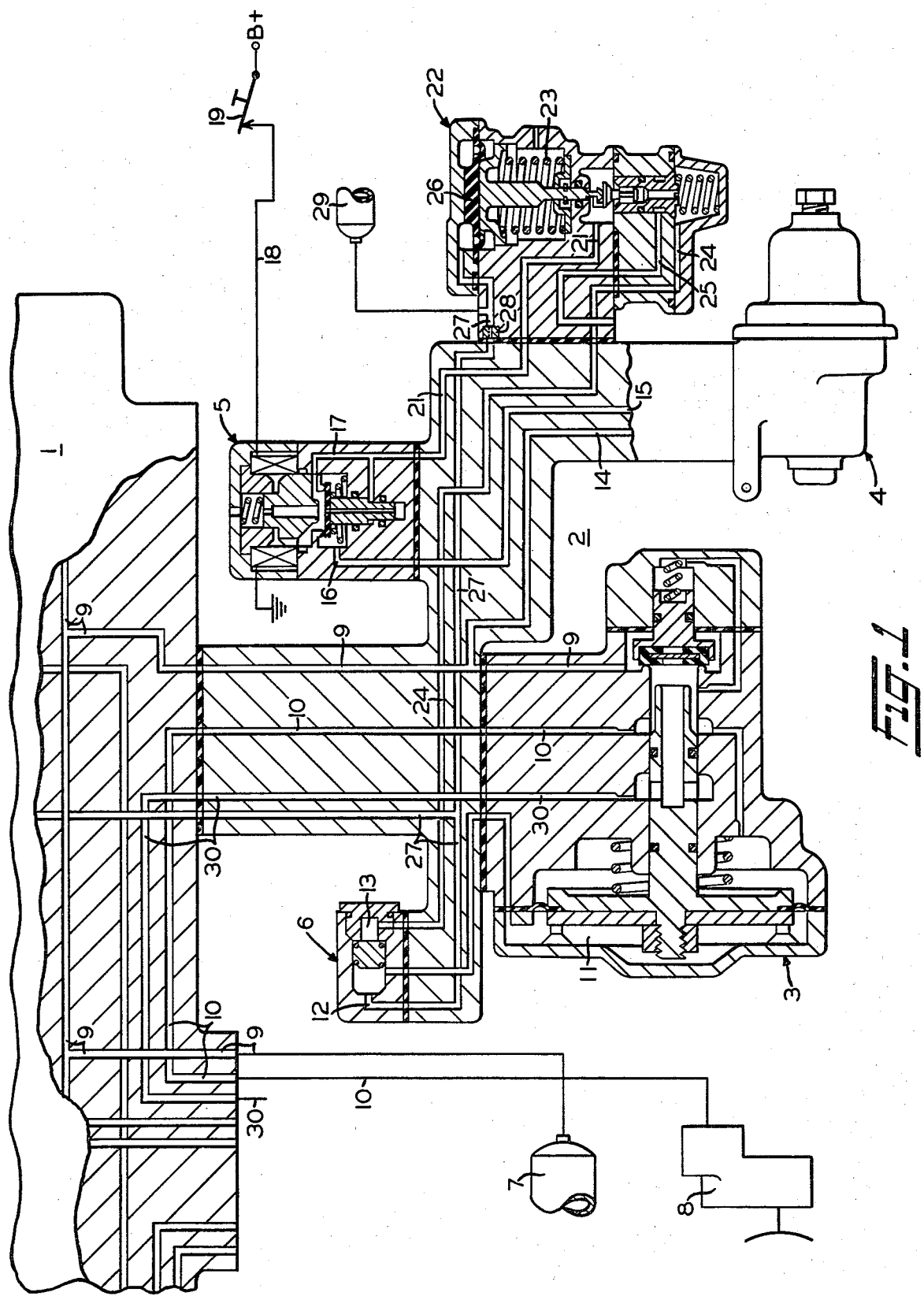

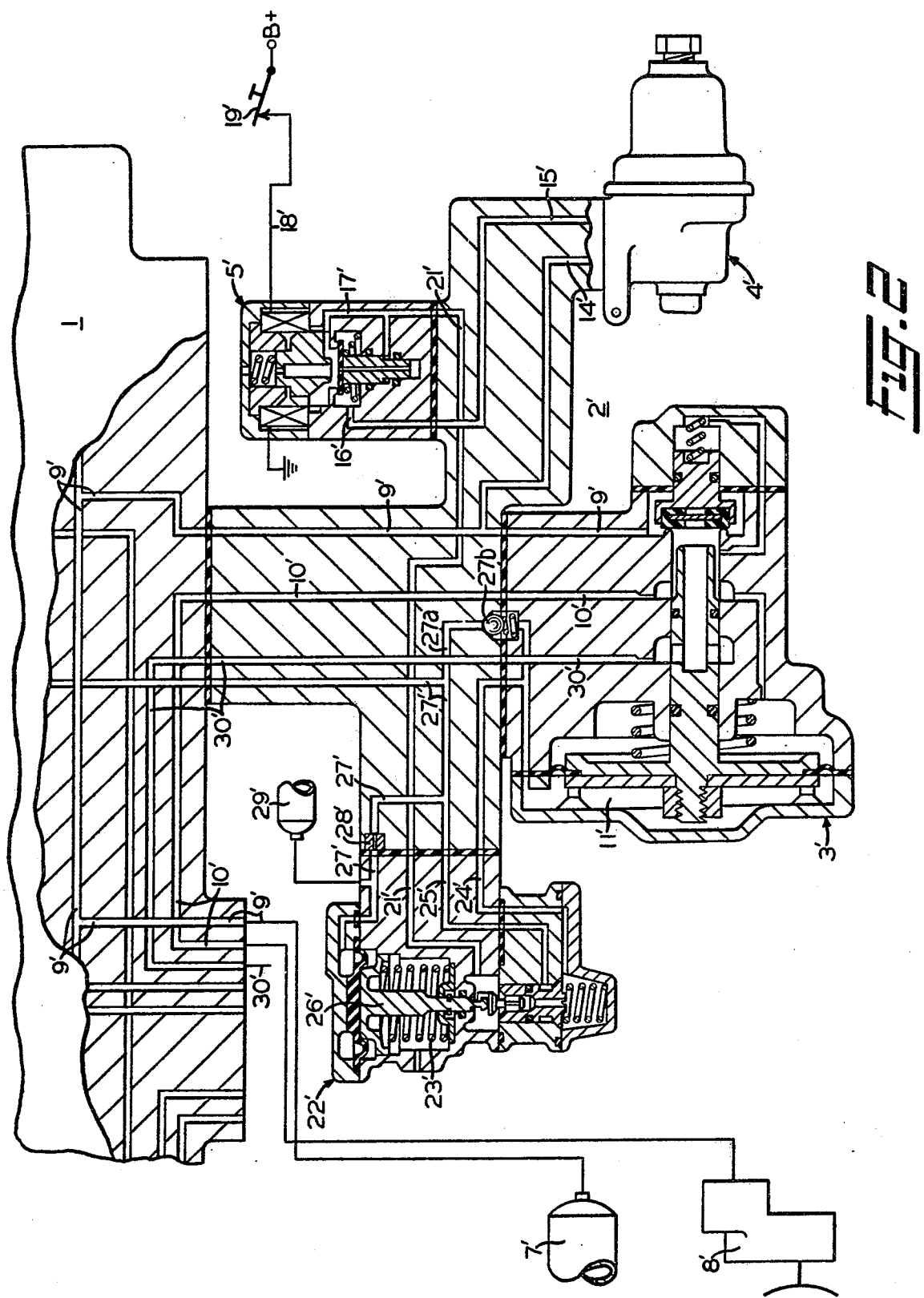

SYSTEM FOR AUTOMATICALLY DELAYING APPLICATION OF A SNOW BRAKE FOR A RAILWAY VEHICLE

BACKGROUND OF THE INVENTION

The present invention is related to brake apparatus having a "snow brake" function and particularly to such apparatus when associated with brake units having automatic slack adjusters.

Railroad vehicles operating in transit type service typically employ brake units similar to the type shown and disclosed in U.S. Pat. No. 3,707,208, in which an automatic, single-acting slack adjuster is employed to compensate for brake shoe/wheel tread wear. Operation of this slack adjuster mechanism is predicated upon movement of the brake apparatus to brake release position.

During winter conditions, the above-mentioned "snow brake" feature may be selectively activated by the train operator or attendant to automatically provide a light brake application during normal periods of brake release. In this way, friction generated by brake shoe/wheel tread engagement produces sufficient heat to prevent the accumulation of ice and snow between the brake shoe and wheel tread, without any significant braking action being realized.

In maintaining a light brake application in effect, however, the "snow brake" feature precludes movement of the brake apparatus to brake release position and accordingly renders the slack adjuster mechanism inoperative. It is therefore a requirement of the operator or train attendant to periodically (generally at the beginning of each day or each work shift) deactivate the "snow brake" and effect several cycles of brake applications and releases to allow operation of the slack adjuster mechanism to take up slack previously accumulated during activation of the "snow brake".

SUMMARY OF THE INVENTION

The object of the present invention, therefore, is to automatically withhold operation of the "snow brake" function during release of each brake application, for a predetermined time period sufficient to permit retraction of the brake apparatus and accordingly assure slack adjuster operation to take up slack due to brake shoe/wheel wear.

This objective is accomplished in one embodiment of the present invention by means of a pneumatic valve via which "snow brake" control pressure is connected to the brake relay valve device. The pneumatic valve is controlled by the normal brake control pressure, so that during a normal brake application, the "snow brake" control pressure is cut off from the one inlet of a double check valve. The opposite inlet is subject to the normal brake control pressure, which is thus connected, in the absence of "snow brake" pressure at the one inlet, to a relay valve device to provide the braking pressure.

When the braking pressure is depleted below a predetermined value during a brake release, the pneumatic valve operates to re-establish "snow brake" control pressure at the one inlet of the double check valve, which in turn connects this "snow brake" control pressure to the relay valve device to provide a light brake application in the absence of a normal brake application. In order to allow the normal brake application to be completely released before the "snow brake" application becomes effective, so as to assure operation of the brake unit slack adjuster, a timing volume and choke are connected to the control chamber of the pneumatic valve to delay its operation to re-establish the "snow brake" connection.

In a second embodiment of the invention, the pneumatic valve is arranged to control the connection of either the normal brake control pressure or the "snow brake" control pressure to the relay valve device, and thus permits elimination of the double check valve of the first embodiment.

BRIEF DESCRIPTION OF THE DRAWINGS

This and other objects and attendant advantages will become apparent from the following detailed description and operation, when taken with the accompanying drawings in which:

FIG. 1 is a diagrammatic view showing the "snow brake" portion of a conventional transit type control valve, arranged to delay application of the "snow brake" in accordance with the present invention; and FIG. 2 is a diagrammatic view showing an alternate embodiment of the invention.

DESCRIPTION AND OPERATION

Referring now to FIG. 1, there is shown a conventional, transit type brake control valve device 1 having the usual "snow brake" portion 2 attached to it. "Snow brake" portion 2 includes a self-lapping relay valve device 3, a pressure regulator 4, a two-way magnet valve device 5, and a double check valve device 6. As is well known in the art, relay valve device 3 delivers brake pressure from a supply reservoir 7 to the vehicle brake units 8 during a brake application via a supply line and passage 9 and a delivery line and passage 10, in proportion to the control pressure effective in the relay valve control chamber 11, and releases this pressure during brake release via a passage 30. This control pressure is provided by way of a double check valve device 6, in accordance with the preponderant pressure effective at the opposing inlets 12 and 13 of the double check valve device. Inlet 12 is subject to the normal brake control fluid pressure developed by the control valve device 1 in a well-known manner, while inlet 13 is subject to the fluid pressure developed by pressure regulator 4, hereinafter referred to as "snow brake" control pressure. Pressure in supply reservoir 7 is also connected from supply passage 9 to a branch passage 14 leading to the inlet of pressure regulator 4, which is adjustable and operable in a well-known, conventional manner to provide and maintain "snow brake" pressure at its outlet to which a passage 15 is connected. Passage 15 is in turn connected to inlet 16 of magnet valve device 5. In its de-energized condition, magnet valve device 5 cuts off inlet 16 from outlet 17, and vents outlet 17 to atmosphere. In its energized state, magnet valve 5 cuts off outlet 17 from atmosphere, and connects outlet 17 to inlet 16. A control wire 18 controls the state of energization of magnet valve 5 in accordance with the open or closed position of a switch 19 that may be conveniently located in the railway vehicle cab for operation by the operator or train attendant, when the "snow brake" operation is desired.

Outlet 17 is connected via a passage 21 to a pneumatic valve 22 that is normally positioned by a spring 23 to connect passage 21 to a passage 24 leading to inlet 13 of double check valve device 6, and to cut off passage 24 from a passage 25 leading to atmosphere. A piston valve 26 of pneumatic valve 22 is arranged in parallel with inlet 12 of double check valve 6 and is connected to the normal brake control pressure developed by control valve device 1 via passage 27 and a choke 28. A volume reservoir 29 is connected to passage 27 downstream of choke 28 for a purpose hereinafter explained. When this normal brake control pressure exerts sufficient force on piston 26 to overcome the opposing force of spring 23, the pneumatic valve is operated to a position in which passage 21 is cut off from passage 24, and passage 24 is vented to atmosphere via passage 25. In this latter position of pneumatic valve 22, "snow brake" control pressure is cut off from inlet 13 of double check valve device 6 and thus from control chamber 11 of relay valve device 3, irrespective of the state of energization of magnet valve 5.

Assuming now that magnet valve device 5 is energized by closure of switch 19 to activate the "snow brake" operation, magnet valve 5 will be energized to connect the regulated "snow brake" control pressure from regulator 4 to pneumatic valve 23 via passage 15, inlet 16 and outlet 17 of magnet valve 5, and passage 21. If a brake application is in effect, normal brake control pressure is developed in passage 27 by control valve device 1. This pressure is effective at inlet 12 of double check valve device 6, so that upon exceeding the relatively low "snow brake" control pressure at inlet 13, the double check valve is positioned to connect this normal brake control pressure to control chamber 11 of relay valve device 3. Braking pressure proportional to the normal brake control pressure is thus developed by relay valve device 3, in a well-known and conventional manner, and is connected to brake unit 8 via delivery passage and line 10 to operate the vehicle brakes.

This normal brake control pressure is concurrently connected via passage 27 and choke 28 to volume reservoir 29 and the chamber above piston 26 of pneumatic valve 22. When this pressure is sufficient to overcome the force of spring 23, piston valve 26 is actuated to cut off the connection of "snow brake" control pressure at passage 21 from passage 24 leading to inlet 13 of double check valve device 6, and to vent inlet 13 to atmosphere via passages 24 and 25.

The volume of reservoir 29 and size of choke 28 is such as to delay the resetting of piston 26 by spring 23 of pneumatic valve 22, when a release of the brake application is made, in order to withhold application of the "snow brake" until such time as the normal brake application has been fully released.

As the effective brake control pressure in control chamber 11 of relay valve device 3 is exhausted by brake control valve device 1, via inlet 12 of double check valve device 6, and passage 27, the actuating pressure acting on piston 26 of pneumatic valve 22 is also reduced via passage 27, but at a considerably slower rate, due to the effect of choke 28 and volume reservoir 29. Consequently, relay valve device 3 operates to exhaust the effective brake pressure at brake units 8 via pipe and passage 10 and exhaust passage 30, to release the brakes before pneumatic valve 22 is able to reset.

In thus effecting retraction of the brake apparatus to release the brakes, the slack adjuster mechanism of brake unit 8 is thus actuated to take up any slack due to brake shoe/wheel tread wear.

As the force exerted by the actuating pressure on piston valve 26 of pneumatic valve 22 falls below the force of spring 23 following the imposed time delay, the piston is reset to its normal position in which "snow brake" control pressure is connected from passage 21 to passage 24 leading to inlet 13 of double check valve device 6. Since the normal brake control pressure at inlet 12 has been exhausted, the "snow brake" control pressure is effective to shift the double check valve element, which thereby connects the "snow brake" control pressure at inlet 13 to chamber 11 of relay valve 3. Thus, a "snow brake" application is produced by relay valve device 3, in accordance with the regulated "snow brake" control pressure effective at chamber 11 during release of a normal brake application, and sufficient to maintain light brake shoe/wheel tread engagement. The friction of this light brake application generates sufficient heat to prevent ice from forming in the area of the brake shoes, thus assuring more positive and prompt brake response during a subsequent normal brake application.

In the simplified embodiment of FIG. 2, a pneumatic valve 22' similar to valve 22 of FIG. 1 is employed in place of double check valve device 6. In this arrangement, identical parts are provided with like reference numerals distinguished by a prime mark.

"Snow brake" control is activated in the usual way by closure of switch 19', so that during periods of normal brake release, the brake shoes are maintained in light contact with the wheel treads.

When a brake application is subsequently made, control valve device 1' is operative in a conventional, well-known manner to establish normal brake control pressure in passage 27'. This pressure flows via choke 28' to volume reservoir 29' and to the control chamber above piston valve 26'. When this pressure builds up on piston valve 26' with sufficient force to overcome the bias force of spring 23', piston valve 26' is shifted downward to a position cutting off "snow brake" control pressure and connecting the normal brake control pressure from passage 27' to control chamber 11' of relay valve device 3' via passage 24'. A branch passage 27a concurrently connects pressure from passage 27' to control chamber 11' of relay valve device 3' in bypass of pneumatic valve 22', in order to avoid a delay of the brake application during the time required for the pressure acting on piston valve 26' to build up sufficient force to overcome spring 23'. Relay valve device 3' operates, in response to the pressure in chamber 11', to connect brake pressure to brake units 8' via passage and line 10'.

During a subsequent brake release, application of the "snow brake" is withheld to obtain full retraction of the brake shoes from the wheel treads, and thus assure slack adjuster operation, as previously discussed. This is accomplished by reason of the control pressure on piston valve 26' and in volume reservoir 29' being exhausted via choke 28', when the normal brake control pressure in passage 27° is released, to thereby delay the resetting of piston valve 26' by spring 23'. The size of volume reservoir 29' and choke 28' is selected to maintain sufficient pressure on piston valve 26' to prevent spring 23' from moving piston 26' upward for a period of time sufficient to allow full retraction of the brake apparatus to render the slack adjuster mechanism of brake unit 8 operative to compensate for brake shoe/wheel wear.

Following this delay period, piston valve 26' is reset to its upward-most position, in which passages 21' and 24' are communicated and passage 25' is cut off from passage 24'. Accordingly, "snow brake" control pressure is connected to the relay valve control chamber 11' to cause the relay valve to apply light "snow brake"

pressure to brake units 8 via passage and line 10'. A one-way check valve 27b is provided in bypass passage 27a to prevent the "snow brake" control pressure from escaping to atmosphere via vented passage 27'. This check valve 27b is cheaper than the double check valve 6 in FIG. 1 which is eliminated by the use of pneumatic valve 22' in its stead in FIG. 2.

Having now described the invention, what I claim as new and desire to secure by Letters Patent, is:

1. A brake control system for controlling brake apparatus to apply and release the brakes of a railway vehicle comprising:
   (a) means for providing a first brake control pressure in accordance with the degree of brake desired during a normal brake application;
   (b) means for providing a second brake control pressure at a predetermined level to provide a light brake application during release of said normal brake application, said predetermined level of said second brake control pressure being less than said first brake control pressure;
   (c) relay valve means subject to said first and second brake control pressures for effecting operation of said brake apparatus;
   (d) control valve means for connecting the higher one of said first and second brake control pressures to said relay valve means; and
   (e) timing means for delaying operation of said control valve means so as to withhold said connection of said second brake control pressure to said relay valve means for a predetermined time following release of said first brake control pressure, thereby permitting operation of said brake apparatus to a brake release position prior to said light brake application becoming effective.

2. A brake control system as recited in claim 1, wherein said control valve means comprises:
   (a) a double check valve device having:
      (i) a first inlet to which said first brake control pressure is connected;
      (ii) a second inlet to which said second brake control pressure is connected; and
      (iii) an outlet via which the predominant one of said first and second brake control pressures is connected to said relay valve means; and
   (b) a pilot operated control valve comprising:
      (i) a control chamber to which said first brake control pressure is connected in parallel with said first inlet of said double check valve to provide pilot control pressure in said control chamber;
      (ii) an actuator in said control chamber subject to said pilot control pressure for urging said control valve toward a first position in which said second brake control pressure is cut off from said second inlet of said double check valve and said second inlet is connected to atmosphere; and
      (iii) bias means acting on said actuator in opposition to said pilot control pressure to urge said control valve toward a second position in which said second inlet is cut off from atmosphere and is connected to said second brake control pressure.

3. A brake control system as recited in claim 2, wherein said timing means comprises:
   (a) a volume reservoir having fluid pressure communication with said control chamber; and
   (b) a choke between said first inlet and said control chamber and volume reservoir via which the exhaust of said pilot control pressure in said control chamber and volume reservoir is restricted when said first brake control pressure is exhausted during a release of said normal brake application to thereby delay operation of said control valve from said first position to said second position.

4. A brake control system as recited in claim 1, wherein said control valve means comprises a pilot operated control valve having:
   (a) a first inlet to which said first brake control pressure is connected;
   (b) a second inlet to which said second brake control pressure is connected;
   (c) an outlet to which said relay valve means is connected;
   (d) a control chamber to which said first brake control pressure is connected, in parallel with said first inlet, to provide pilot control pressure;
   (e) an actuator in said control chamber subject to said pilot control pressure for urging said control valve toward a first position in which said first inlet and said outlet are communicated; and
   (f) bias means acting on said actuator in opposition to said pilot control pressure to urge said control valve toward a second position in which said second inlet and said outlet are communicated.

5. A brake control system as recited in claim 4, wherein said timing means comprises:
   (a) a volume reservoir having fluid pressure communication with said control chamber; and
   (b) a choke between said first inlet and said control chamber and volume reservoir via which the exhaust of said pilot control pressure in said control chamber and volume reservoir is restricted when said first brake control pressure is exhausted during a release of said normal brake application to thereby delay operation of said control valve from said first position to said second position.

6. A brake control system as recited in claim 5, further comprising a bypass passage via which said first brake control pressure is connected to said relay valve means in parallel with said control valve.

7. A brake control system as recited in claim 6, further comprising a one-way check valve in said by-pass passage.

* * * * *